Aug. 25, 1953     A. DOEBELI     2,649,941
ELECTROMAGNETICALLY ACTUATED FRICTION
COUPLING WITH SERVO-ACTION
Filed Oct. 26, 1949     6 Sheets-Sheet 1

Aug. 25, 1953  A. DOEBELI  2,649,941
ELECTROMAGNETICALLY ACTUATED FRICTION
COUPLING WITH SERVO-ACTION
Filed Oct. 26, 1949  6 Sheets-Sheet 3

Patented Aug. 25, 1953

2,649,941

UNITED STATES PATENT OFFICE 2,649,941

ELECTROMAGNETICALLY ACTUATED FRICTION COUPLING WITH SERVO-ACTION

Albert Doebeli, Le Locle, Switzerland

Application October 26, 1949, Serial No. 123,655
In Switzerland October 29, 1948

13 Claims. (Cl. 192—35)

This invention relates to electromagnetically actuated friction couplings with servo-action.

According to the invention an increase in power of the coupling is attained by this servo-action. When the coupling is connected, a preliminary coupling is effected by means of a frictional force of the preliminary coupling, so that balls lying in conical recesses along a radius smaller than the radius of the preliminary coupling and radially guided, roll up in the recesses and press a servo-member on friction surfaces of the coupling by wedge action, so that the freely movable servo-member with its conical recesses under friction force and servo-action turns itself relatively to a member with conical recesses whereby a bearing between the operating members takes place as well as an automatic increase in the pressure applied on the friction surfaces.

The accompanying drawings illustrate several examples of construction according to the invention.

Figures 7, 7a and 8 are details of the examples of construction according to Figures 3 and 5.

Figure 1:
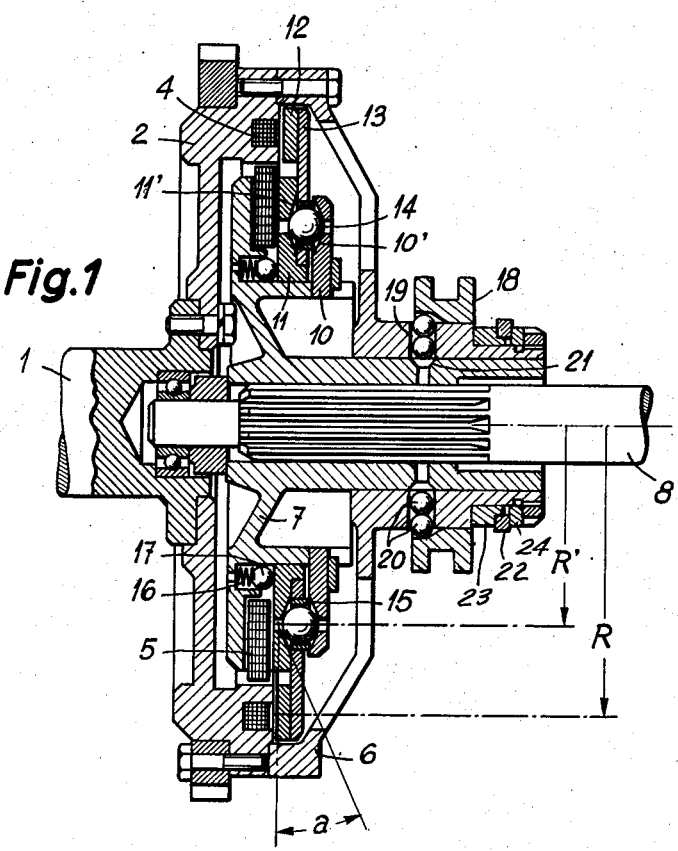
Figure 1 shows a dry single disc coupling, more particularly for power driven vehicles in section.
Figure 2:
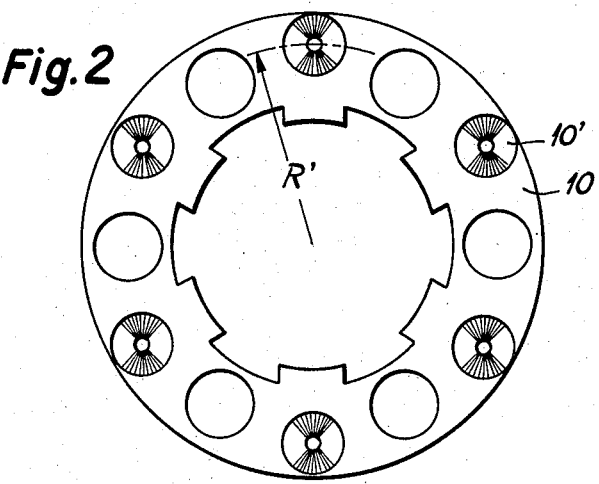
Figure 2 shows a detail for the examples of construction according to Figures 1, 3 and 5.

Referring to the constructional example shown in Figure 1, the driving coupling member is secured to the crankshaft 1 and consists of the following parts: the flywheel 2 of soft iron with the magnet coil 4, constituting therewith the magnet; the friction disc 5 which is provided with recesses or teeth on the outer periphery and is inserted into the flywheel 2, provided on the inside with recesses or teeth. This disc is taken along by the flywheel during its rotation but is capable of longitudinal displacement in the direction of the shaft. The casing 6 is flanged on to the flywheel 2, and is provided with, for instance, six bores 19, in which there are disposed loosely movable locking balls 28, a connecting sleeve 18, and the slip-ring 22 which is rotatably mounted through the interposition of insulating members 23 and 24. In the annular space of the member 2 there is embedded the magnet coil 4, the two terminals of which are connected to the mass of the device and to the slip ring respectively.

The driven coupling member consists of the coupling shaft 8 and the transmitting member 7; shaft 8 is splined to a hub of member 7. The transmitting member 7 comprises: a rotary and axially stationary disc 10 on a medium radius R' with conical recesses 10' and a servo-member 11 on the same radius R' with conical recesses 11', which latter member is freely rotatable and freely movable in the axial direction; a ball cage 13, cast for instance in brass, in which there are inserted hardened steel bushes 15 carrying balls 14 to be rolled up in the conically shaped recesses. The ball cage 13 is constructed as a preliminary coupler and is provided for this purpose with an annular disc 12 of soft iron which is, for instance, riveted on. The preliminary coupler is mounted freely rotatably between the members 10 and 11. The members 10, 11 and 13 are connected together by the balls 14 in the cage 13 which lie between the conically shaped recesses 10' and 11'. Pressure springs 16, for instance, six of them, arranged in the member 7 exert a pressure on the servo-member 11 and the latter ensures that the balls 14 are firmly held in the conically shaped recesses so long until the coupling is connected up. Since after the connection of the coupling a relative rotation takes place between the servo-member 11 and the members 7 and 10, balls 17 are associated with the pressure springs 16. The transmitting member 7 and the servo-member 11 constitute each a friction surface for the outer friction disc 5. The medium line of the operating zone of the electro-magnet is situated on a radius R which is greater that radius R'. The hub of the transmitting member 7 is provided with a ring of openings 21 for the locking balls 20 which can be moved into the said openings.

The operation of the coupling hereinbefore described is as follows: Upon current being supplied to the annular coil 4 by the brush, which is mounted in the casing of the coupling, lines of force are produced in the annular magnet 2, which lines of force pass on to the armature disc 12 and attract the same towards the end surface of the magnet. The pressure applied produces a friction force (torque) which is transmitted to the preliminary coupler, whereby the latter turns relatively to the member 10 thereby effecting a rolling up of the balls 14 in the conically shaped recesses 10'. In this way the servo-member 11 is compelled to move in the axial direction away from the member 10, whereby the friction surfaces of the main coupling are pressed against each other with wedge-action. Now, under friction force, the servo-member 11 is turned by the driving or retarding friction disc 5 in the direction of rotation of the latter or retarded in the rotary movement by servo-action and it tends to turn itself relatively to the member 10, whereby a bearing between the operating members 10 and 11 take place, whereby an additional pressure force is produced for the friction surfaces of the main coupling. Thus the coupling provides a self-servo-action in so far as it itself increases the pressure for the friction surfaces in both directions, viz: when the motor drives, and the power is thus tranmsitted from it to the gear or when the power is transmitted from the gear to the motor, the latter acting as a brake.

The servo-action of the coupling may be varied by a selection of the conical angle $a$.

In friction couplings, the value of the tangent of the conical angle $a$ must be greater than the friction co-efficient between the friction surfaces of the main coupling.

When the excitation current is switched off the preliminary coupler is uncoupled from the magnet and the pressure exerted by the springs 16 upon the servo-member 11 causes the balls 14 in the conical recesses 10' and 11' to roll back, the servo-member 11 and the preliminary coupler 13 returning to their original position, and the friction surfaces being thereby released.

The automatic adjustment of the coupling when the friction surfaces are worn is effected by the conical recesses being made of such depth that in the case of such wear the balls 14 can always roll up sufficiently in the recess, whereby the used press-power on the friction surfaces of the coupling relays constantly the same.

The force by which the preliminary coupler actuates the servo-member, that is to say presses on friction surfaces, is dependent upon the pressure of the magnet, and therefore its action is dependent solely upon the voltage; the corresponding supply of current ensures a soft and gradual connection of the coupling.

This construction of the coupling requires only small magnet coils and a minimum of current consumption for the transmission of the large torques.

A direct connection between the shafts 8 and 1 can be obtained by means of the coupling device which consists of the connecting sleeve 18, the locking balls 20 in the openings 19 of the casing 6 and the ring of openings 21 in the hub of the member 7.

This coupling device ensures the safety of the vehicle when mounting with the electric coupling disconnected, by inserting the lowest gear in opposition to the drop (first gear forward or the reverse gear) and by actuating the connecting sleeve 18, which moves the locking balls 20 into the openings 21.

It is further possible by means of this coupling device to effect the starting of the motor by means of the gear, in the absence of an electric starting current, by the driving action of the vehicle itself or to drive the vehicle without using the electromagnetically actuated coupling, for instance, in direct gear.

The electromagnetically actuated friction coupling may also be provided with an oscillation damping device; however, since the coupling does not take place quickly but softly, an oscillation damper can in most cases be dispensed with.

Figure 3:
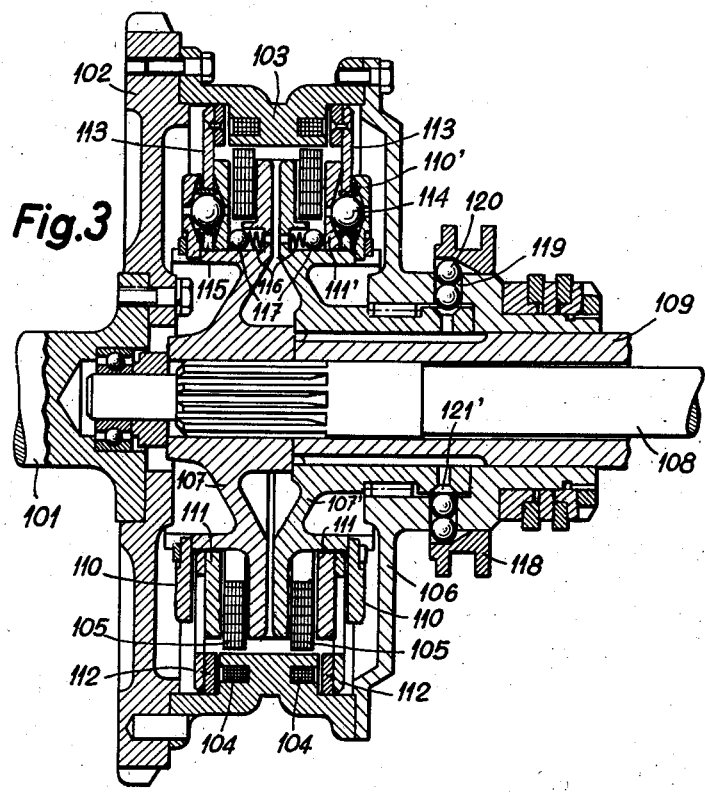
Figure 3 shows a dry double coupling, more particularly for power driven vehicles in section.
Figure 4:
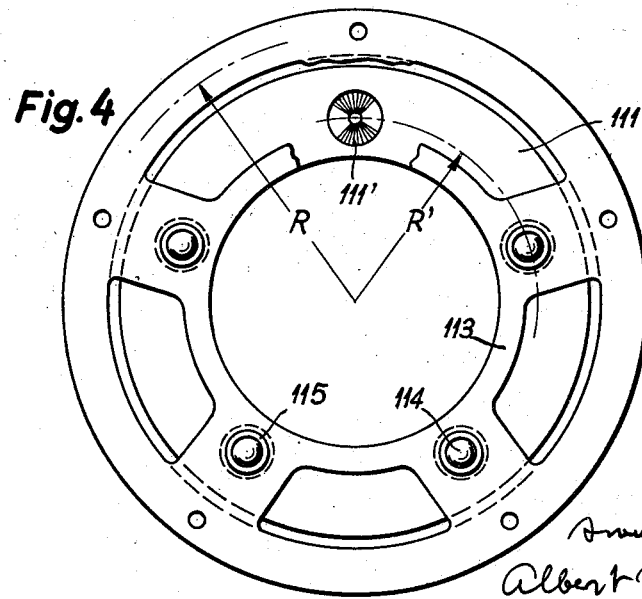
Figure 4 is a plan view of a ball cage constructed as a preliminary coupler with a freely rotating servo-member for the examples of construction according to Figures 1 and 3.

Figure 3 illustrates an electromagnetically actuated double friction coupling with servo-action, more particularly for power driven vehicles; the two couplings are of the same construction and operate in the same way as the coupling described with reference to Figure 1. With the driving member, that is to say with the flywheel 102, there is connected a coupling member 103, constructed as a magnet which is provided with an annular adhering surface, a magnet coil 104 and a friction disc 105 for each coupling. The coupling device, connecting sleeve 118, locking balls 120 in the bores 119 of the casing 106, and the ring of openings 121' in the hub of the member 107' enable the direct connection of the hollow shaft with the shaft 101 to be effected.

The safety of the vehicle when mounting can be ensured by connecting up the lowest gear forward or by reversing or by mechanically actuating the connecting sleeve 118.

Figure 5:
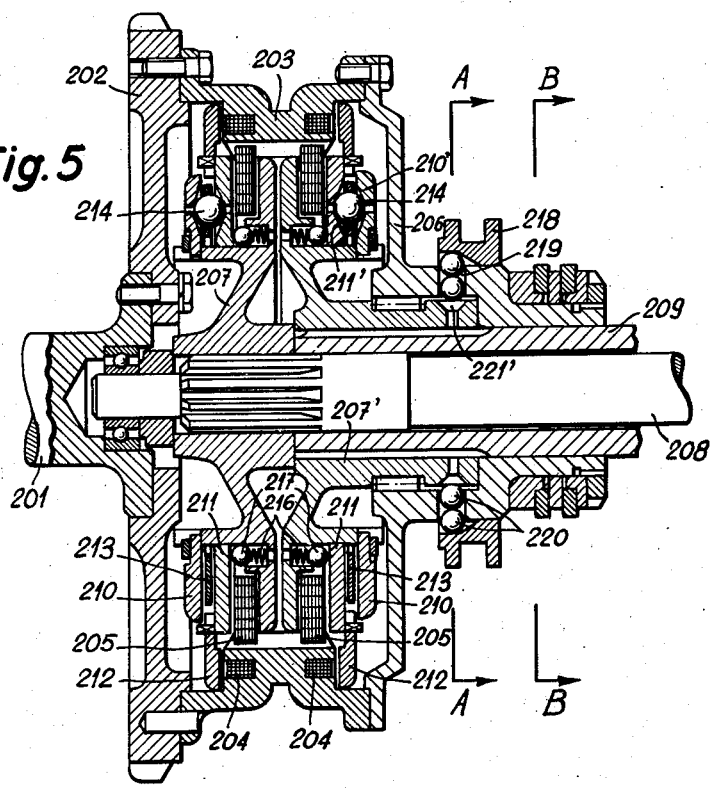
Figure 5 shows a double coupling more particularly for power driven vehicles in section.

Figure 5 shows a double coupling more particularly for power driven vehicles. In this double coupling the servo-member 211 of each coupling is itself constructed as a preliminary coupler. The armature disc 212 is splined to the servo-member 211, which can, however, be displaced in the axial direction relatively to the outer friction disc 205 independently of the armature disc 212.

In order to prevent a movement of the balls 214 under the action of the centrifugal force, these are guided by means of a brass cage 213.

When a coupling is connected up the armature disc 212 is drawn by the rotating magnet 203 and is taken along in the direction of rotation of the latter by friction.

The servo-member 211 is also rotated with the armature disc 212, and the member 210 stands back so that the two members 211 and 212 which constitute together the preliminary coupler are turned relatively to the member 210. The balls 214 roll up in the recesses 210' and 211', the servo-member 211 effects by its turning relatively to the member 210 an axial displacement towards the frictional surfaces and presses the latter against one another by wedge action; by the friction of the disc 205 the servo-member 211 produces an additional pressure for the frictional surfaces.

Figure 6:
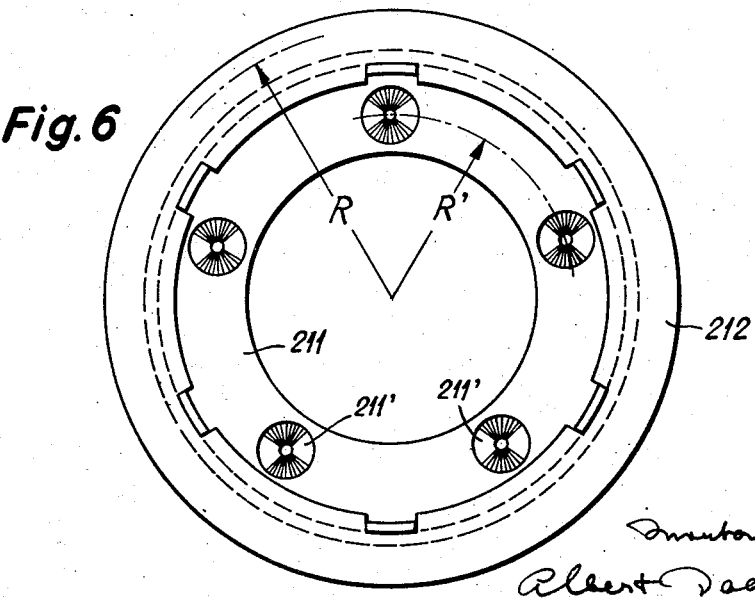
Figure 6 is a plan view of a servo-member constructed as a preliminary coupler for the example of construction according to Figure 5.

Figure 6 shows in plan view the connection between the members 211 and 212.

Figures 7, 7A:
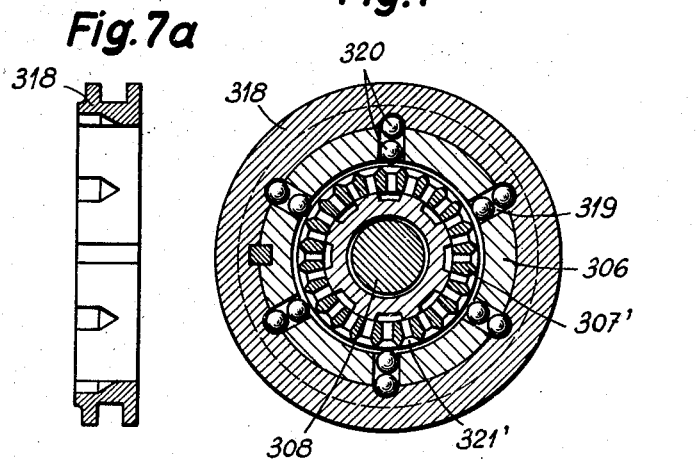
Figure 7 is a section along the line A—A in Figure 5.
Figure 7a shows a connecting sleeve in section.

Figure 7 shows the ring of openings 321' in the hub of the member 307', into which openings the loose movable locking balls 320 of the member 306 are moved by means of the connecting sleeve 318. The connecting sleeve 318 is connected with the member 306 by key action in such a manner that it is not rotatable relatively thereto being, however, free to move in the axial direction. A similar ring of openings 321' is provided for the hub of the member 307 in Figure 7.

Figure 7a shows the necessary recesses for the locking balls 320 in the connecting sleeve 318.

Instead of the recesses, the connecting sleeve may be provided with an annular inclined surface by means of which the locking balls 320 can be moved inwardly.

Figure 8:
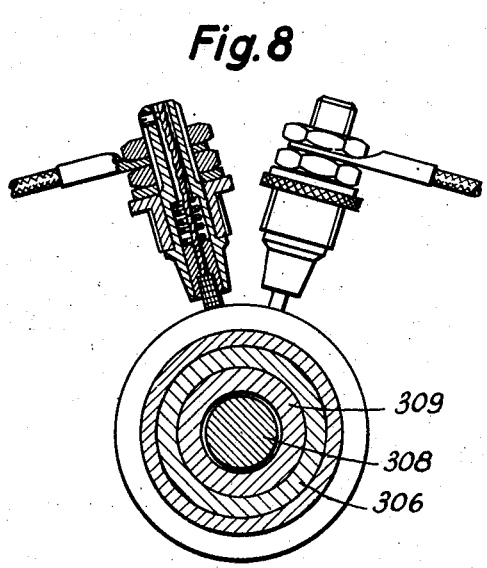
Figure 8 is a section along the line B—B in Figure 5 and shows the arrangement of the brushes supplying current to the slip-rings of the double coupling.

Figure 8 shows the position of the two brushes on the slip rings of the double coupling. Instead of the two brushes there may be provided a movable contact piece.

Figure 9:
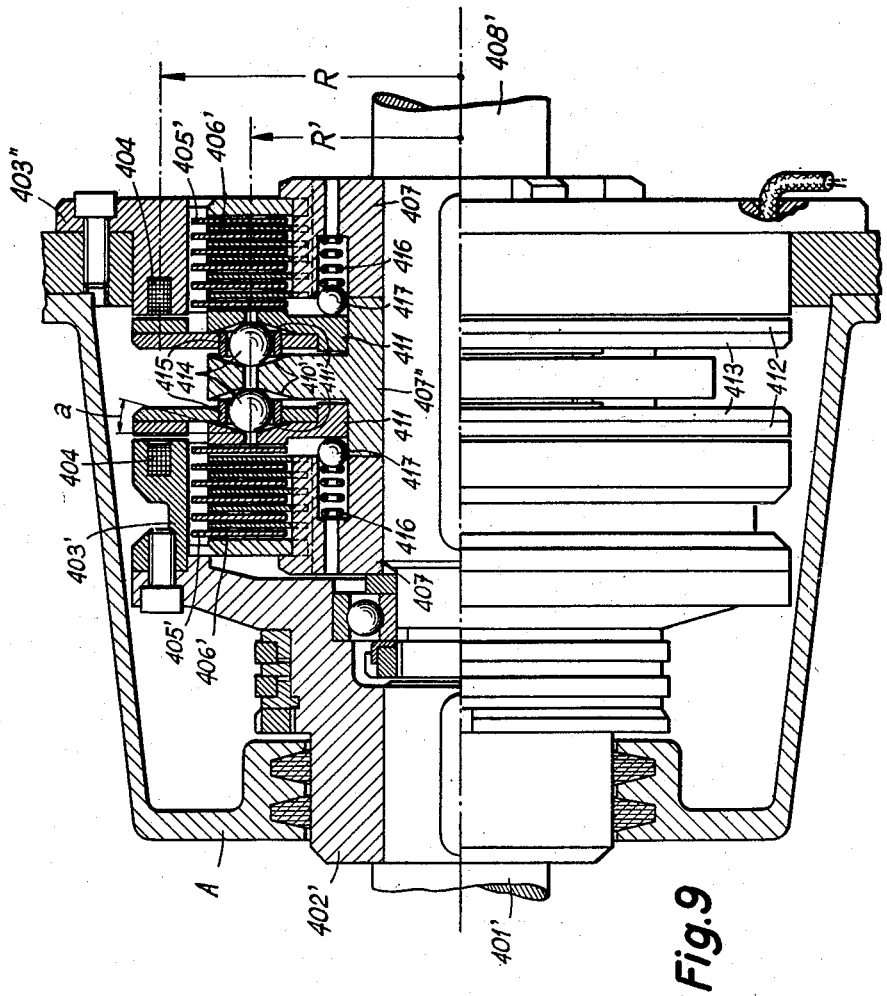
Figure 9 shows a double coupling in an oil bath, for instance, for the construction of machine tools the upper half of the coupling being a section and the lower half a plan view.

Figure 9 illustrates an example of construction of an electromagnetically actuated double lamination coupling with servo-action, more particularly for machine tools.

The left-hand coupling is a driving coupling and the right-hand one, a brake coupling; both lie in an oil bath. The two brushes for the driving coupling are arranged in the stationary member A shown in Figure 8. The driving elements of the driving coupling are: shaft 401', member 402', magnet 403', with coil 404 and the outer laminations 405' which are arranged in the magnet 403'. The driven shaft 408' which, after the disconnection of the driving coupling by the insertion of the brake coupling, has to be brought to immediate rest also with large centrifugal moments comprises as regards the driving and brake coupling the following parts: for each a member 407 serving as a lamination carrier for the inner laminations 406', and a middle member 407" common for the two couplings and provided with recesses 410' on a medium radius R' for the left-hand and right-hand coupling. The two members 407 and the middle member 407" are secured on the shaft 408' so that they cannot rotate and be axially displaced thereon. On the middle member 407" there is also centrally mounted the freely rotatable members 411 and 413 of each coupling. A member 413 with an armature disc 412 constitute together a preliminary coupler. Springs 416 and balls 417 of each coupling, f. i. disposed at an angular distance of 120° from each other, are associated with each member 407. The right-hand coupling is further provided with a stationary magnet 403", with a magnet coil 404, an annular adhering surface and outer laminations 405'.

The operation of the driving coupling is the same as the operation of the coupling according to Figure 1.

The friction arising between the laminations is small and thus the conical angle $a$ for the recesses can also be made small.

After the disconnection of the driving coupling the brake coupling is connected up, whereby lines of force are produced in the stationary annular magnet 403". These pass on to the rotating armature disc 412 and thereby attract the preliminary coupler 413 against the end surface of the stationary magnet. The applied pressure produces a braking moment and brakes the preliminary coupler; the shaft 408' with the members 407 and the member 407" as well as the inner laminations 406' continue to rotate and there results a relative rotation between the member 407" and the braked preliminary coupler, whereby the balls 414 of the brake coupling roll up in the conically shaped recesses 410' of the brake coupling and cause the servo-member 411 of the brake to press the friction discs against one another by wedge action; the friction of the stationary laminations brakes the freely rotatable and still rotating servo-member, whereupon the latter, under the servo-action, itself tends to turn relatively to the member 407" and produces an additional pressure for the frictional surfaces, which enables the shaft 408' to be brought immediately to a standstill also in the case of large centrifugal moments. When the excitation current is switched off the preliminary coupler is released and the pressure springs 416 cause the servo-member and the preliminary coupler to return to their original position, whereby the balls roll back into the recesses.

In these electromagnetically actuated lamination couplings with servo-action the direct introduction of the current can take place in the oil bath; the couplings effect a soft transmission of the forces.

It should be pointed out, that more especially in the case of double driving couplings the pressure springs 416 effect such a pressure on the servo-member that when a coupling is connected up no relative rotation can take place between the preliminary coupler and the member with the conical recesses 410' of the other coupling and the balls 414 must remain in the recesses 410' and 411' until the coupling is connected up.

Double driving couplings can be used with great advantage in the construction of machine tools in an oil bath with a continuous shaft, for instance, for the alternate connection of two toothed wheels mounted on the hubs of the members 402" and of the same with the continuous shaft for obtaining different speeds in the same direction of rotation, or with an intermediate shaft for obtaining two speeds with alternating directions of rotation; the members 402' of the left-hand and right-hand coupling with the toothed wheels and magnets are mounted freely rotatably on the shaft and the two members 407 and the common middle member 407" are secured to the shaft as shown in Figure 9 in such a manner that it cannot rotate and be axially displaced thereon.

Figures 10, 11:
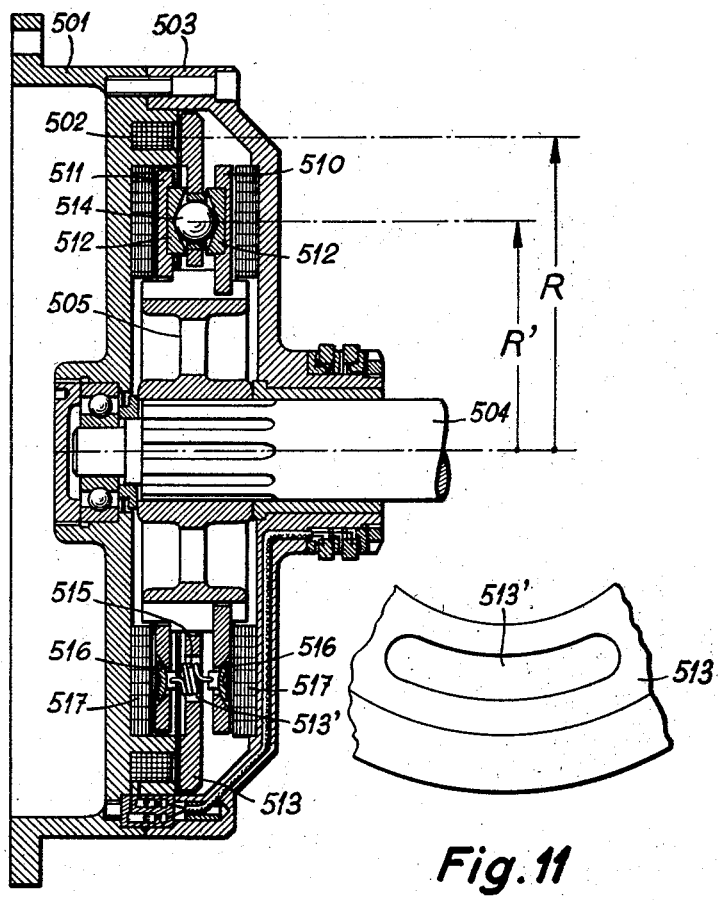
Figure 10 shows a flange-dry-coupling, f. i. for coupling a shaft with a flywheel, in section.
Figure 11 shows a detail for the example of construction according to Figure 10.

The embodiment according to the Figures 10 and 11 relates to a flange-dry-coupling with two friction surfaces, f. i. for coupling a shaft with a flywheel or with a cone belt wheel for rolling mills, tractors, tool-machines, and so on.

The transmission of the turning moment is obtained through a like pressure of the operating members 510 and 511 leftside and rightside against the friction surfaces 517 of the elements 501 and 503.

The coupling is shown in its released position.

When the coupling is used, f. i. for vehicles as passenger carriages or goods cars, the coupling uses for the closing of the excitation circuit for the magnet coil 502 only one slipring, the mass constituting the return.

When the coupling is provided for vehicles, the coupling casing 501 is flanged on the flywheel and is screwed on the casing 501 of the couplings cover 503. The magnet coil 502 is imbedded in the coupling-casing 501. The hub of the couplings cover 503 is provided with a strip ring for carrying the current to the magnet coil. This strip ring is dependent in rotation on the hub and insulated on this hub. The friction discs 517 are secured to the members 501 and 503 which constitute one half of the coupling. The both operating members 510 and 511 with the intermediate member 513 are secured to the transmission member 505, which is dependent in rotation on the grooved shaft 504. These members constitute the other half of the coupling. The member 505 is axially unmovable. The operating member 510 is provided with inner extensions which enter in the grooves of the member 505; it transmits the turning moment to this member and thus to the shaft 504, but can slide in the axial direction of the shaft on a shoulder of the member 505. The operating member 511 is the servo-member; it is in both rotation-directions freely rotatable and mounted on the shoulder of the member 505 slidably in the axial direction of the shaft. Between both operating members, which are symmetrical with respect to the member 505 and to the friction surfaces 517, is situated the member 513, which is freely movable in both rotation-directions and in the axial direction; the member 513 is situated in the middle part of the member 505. The periphery of the member 505 is provided with a middle part presenting the greatest diameter; this part is used as a centering diameter and as a guide for the member 513; on the both sides of this middle part are shoulders of smaller diameters for the operating members 510 and 511. It is without effect on the operation of the coupling if the servo-member 511, as shown in the drawing, is rotatably mounted on the left shoulder and the operating member 510, engaged in the member 505 is mounted on the right shoulder unrotatable, but axially slidable, or if the servo-member 511 is right and the operating member 510 left the member 505.

The both operating members 510 and 511 are provided in this embodiment with cages 512 with conical paths and are bound together by balls 514, which are situated between the cages of the both members, and by return springs 515. The middle member 513, which is formed as a preliminary coupler, that is to say as an anchor, constitutes also a cage for the balls 514 which are situated in sleeves made of steel located in the member 513. Three cages at an angular distance of 120° from each other are mounted in each operating member so that these members are pressed uniformly on the friction surfaces 517. The operating members 510 and 511 are bound together by return springs 515 which are situated at same distance from each other between the cages 512, so that, when the current is cut, the operating members go immediately back along the shoulders of the member 505, whereby the member 511 separates the anchor from the magnet coil by means of its cages 512; the turning of the servo-member 511 and of the preliminary coupler 513 relatively to the operating member 510 stops. The springs 515 are secured to the operating members 510 and 511 by the intermediary of bolts 516 which are provided with spherical faces; this arrangement makes possible an angular displacement of the springs produced by the turning of the servo-member 511 relatively to the operating member 510. The preliminary coupler 513 carries three sleeves made of steel which are at a distance of 120° from each other and situated on the same radius R' as the cages 512 in the operating members 510 and 511; these sleeves guide the balls 514 in the radial direction and prevent the action of the centrifugal force at the high rotation-speeds. The preliminary coupler is provided with three apertures 513' for the springs 515, which make possible a rotation of the preliminary coupler 513 relatively to the operating member 510 in both directions as well as the rotation of the servo-member 511 relatively to the operating member 510.

In the couplings for the transmission of very high turning moments, the operating members 510 and 511 can be provided each with five cages 512 with conical paths, between which are situated the radially guided balls; five return springs 515 can also be provided.

The operation of this coupling (Figs. 10 and 11) is the following:

When the coupling is put into action, the preliminary coupler 513 overcomes the force of the return springs 515 applied on the servo-member 511 (which, when the coupling is put out of service, separates the anchor from the magnet coil) and is attracted by the revolving magnet-member 501, bridging over the air gap; a friction takes place by the contact of the friction surface of the magnet-member 501 with the friction surface of the preliminary coupler 513. A friction force acts then on the preliminary coupler 513, with the greater radius R whereby this latter turns relatively to the operating member 510; the balls 514, on the medium radius R', roll then under the action of this turning of the preliminary coupler 513 in the conical paths of the cages 512 of the member 510 and produce the pressing of both operating members against the friction surfaces 517 with wedge action: the member 510 is pressed against the friction surface 517 of the coupling's cover 503 and the member 511 against the friction surface 517 of the coupling's casing 501. A friction force takes place on the servo-member 511 by the pressure of the freely rotatable servo-member 511 against the revolving friction surface 517 under the pressure which is produced by the friction force of the preliminary coupler with the radius R; this friction force is transmitted on a circle the radius R' of which is smaller than the radius R to the balls 514 which are disposed in the cages with conical paths, whereby the wedge action and a bearing between the operating members take place, increasing the pressure of the operating members 510 and 511 on the friction surface 517.

This self-servo-operation of the coupling is equally effective in both directions of the forces when the motor drives or when it operates as a brake.

The turning moment is transmitted from the two friction surfaces of the operating member 510 to the member 505 and from this latter to the shaft 504; or the transmission takes place from the shaft 4 to the member 505 and to the operating member 510 through the two friction surfaces (motor used as a brake).

When the excitation current is cut, the friction surfaces of the coupling are separated from the operating members 510 and 511 by the return springs 515; the operating members are pressed against the shoulders, the face of the return spring acts on the operating members so that the balls 514 are pressed in the ground of the conical paths of the cages 512, whereby the turning of the preliminary coupler 513 and of the servo-member 511 relatively to the operating member 510 stops, up to the next putting into action of the coupling.

What I claim is:

1. A clutch apparatus, comprising in combination, a rotatable driving structure; a rotatable driven structure coaxial with said driving structure and having a clutching face portion fixedly connected thereto; a first member mounted on said driven structure for rotation therewith; a second member loosely mounted on said driven structure, said first and second members each having a surface portion and said surface portions facing each other and each being formed with at least one wedge-shaped recess, said recesses being in substantial alignment with each other; a ball member located in the space between said recesses and being supported by said members; friction means slidably connected to said driving structure for rotation therewith and being loosely located between said clutching face portion of said driven structure and said second member on the opposite side of the latter from said first member; and moving means associated with said second member for moving the latter together with said friction means toward said clutching face portion of said driven structure to engage the latter with said friction means.

2. A clutch apparatus, comprising in combination, a rotatable driving structure; a rotatable driven structure coaxial with said driving structure and having a clutching face portion fixedly connected thereto; a first member mounted on said driven structure for rotation therewith; a second member loosely mounted on said driven structure, said first and second members each having a surface portion, said surface portions facing each other and each being formed with at least one wedge-shaped recess, said recesses being in substantial alignment with each other; a ball member located in the space between said recesses and being supported by said members; friction means slidably connected to said driving structure for rotation therewith and being loosely located between said clutching face portion of said driven structure and said second member on the opposite side of the latter from said first member; electromagnetic means associated with said ball member for moving the said second member together with said friction means toward said clutching face portion of said driven structure to engage the latter with said friction means; and spring means operatively connected to said second member for moving same toward said first member when said electromagnetic means is de-energized.

3. A clutch apparatus, comprising in combination, a rotatable driving structure; a rotatable driven structure coaxial with said driving structure and having a clutching face portion fixedly connected thereto; a first member mounted on said driven structure for rotation therewith; a second member loosely mounted on said driven structure for free rotation and axial movement thereon, said first and second members each having a surface portion, said surface portions facing each other and each being formed with at least one conical recess, said recesses being in substantial alignment with each other; a ball member located in the space between said recesses and being supported by said members; friction means slidably connected to said driving structure for rotation therewith and being loosely located between said clutching face portion of said driven structure and said second member on the opposite side of the latter from said first member; electromagnetic means associated with said ball member for moving the said second member together with said friction means toward said clutching face portion of said driven structure to engage the latter with said friction means; and spring means operatively connected to said second member for moving same toward said first member when said electromagnetic means is de-energized.

4. A clutch apparatus, comprising in combination, a rotatable driving structure; a rotatable driven structure coaxial with said driving structure and having an annular clutch face; a first ring member mounted on said driven structure for rotation therewith; a second ring member loosely mounted on said driven structure for free rotation and axial movement thereon, said first and second ring members each having a face portion, said face portions confronting each other and each being formed with a plurality of conical recesses to form pairs of oppositely located recesses; a plurality of ball members respectively mounted in the space between said pairs of recesses and being supported by said ring members; annular friction means loosely located between said annular clutch face of said driven structure and said second ring member on the opposite side of the latter from said first ring member, said friction means being slidably connected to said driving structure for rotation therewith; electromagnetic means associated with said ball members for moving the said second member together with said friction means towards said clutch face of said driven structure to engage the latter with said friction means; and spring means operatively connected to said second ring member for moving the same toward said first ring member when said electromagnetic means is de-energized.

5. A clutch apparatus, comprising in combination, a rotatable driving structure; shaft means rotatably mounted adjacent one end thereof in said driving structure coaxially therewith and having an annular clutch face portion; a first ring member mounted on said shaft means for rotation therewith; a second ring member loosely mounted on said shaft means for free rotation and axial movement thereon, said first and second ring members each having a face portion, said face portions confronting each other and each being formed with a plurality of conical recesses to form pairs of oppositely located recesses; a plurality of ball members respectively mounted in the space between said pairs of recesses and being supported by said ring members; annular friction means loosely located between said annular clutch face of said shaft means and said second ring member on the opposite side of the latter from said first ring member, said friction means being slidably connected to said driving structure for rotation therewith; electromagnetic means associated with ball members for moving the said second member together with said friction means towards said clutch face of said shaft means to engage the latter with said friction means; and spring means operatively connected to said second ring member for moving the same toward said first ring member when said electromagnetic means is de-energized.

6. A clutch apparatus, comprising in combination, a rotatable driving structure; a rotatable driven structure coaxial with said driving structure and having an annular clutch face; a first ring member mounted on said driven structure for rotation therewith; a second ring member loosely mounted on said driven structure for free rotation and axial movement thereon, said first and second ring members each having a face portion, said face portions confronting each other and each being formed with a plurality of conical recesses to form pairs of oppositely located recesses; a plurality of ball members respectively mounted in the space between said pairs of recesses and being supported by said ring members; annular friction means loosely located between said annular clutch face of said driven structure and said second ring member on the opposite side of the latter from said first ring member, said friction means being slidably connected to said driving structure for rotation therewith; electromagnetic means associated with said ball members for moving the said second member together with said friction means towards said clutch face of said driven structure to engage the latter with said friction means, said electromagnetic means comprising an annular electromagnet fixedly connected to said driving structure and a magnetic ring located opposite said electromagnet and being operatively connected to said ball members to move these latter and thereby to move the second member; and spring means operatively connected to said second ring member for moving the same toward said first ring member when said electromagnetic means is de-energized.

7. A clutch apparatus, comprising in combination, a rotatable driving structure; a rotatable driven structure coaxial with said driving structure and having an annular clutch face; a first ring member mounted on said driven structure for rotation therewith; a second ring member loosely mounted on said driven structure for free rotation and axial movement thereon, said first and second ring members each having a face portion, said face portions confronting each other and each being formed with a plurality of conical recesses to form pairs of oppositely located recesses; a plurality of ball members respectively mounted in the space between said pairs of recesses and being supported by said ring members; annular friction means loosely located between said annular clutch face of said driven structure and said second ring member on the opposite side of the latter from said first ring member, said friction means being slidably connected to said driving structure for rotation therewith; electromagnetic means associated with said ball members for moving the said second member together with said friction means towards said clutch face of said driven structure to engage the latter with said friction means, said electromagnetic means comprising an annular electromagnet located about said friction means and being fixedly connected to said driving structure and a magnetic ring located opposite said electromagnet and being operatively connected to said ball members to move these latter and thereby to move the second member; and spring means operatively connected to said second ring member for moving the same toward said first ring member when said electromagnetic means is de-energized.

8. A clutch apparatus, comprising in combination, a rotatable driving structure; shaft means rotatably mounted adjacent one end thereof in said driving structure coaxially therewith and having an annular clutch face portion; a first ring member mounted on said shaft means for rotation therewith; a second ring member loosely mounted on said shaft means for free rotation and axial movement thereon, said first and second ring members each having a face portion, said face portions confronting each other and each being formed with a plurality of conical recesses to form pairs of oppositely located recesses; a plurality of ball members respectively mounted in the space between said pairs of recesses and being supported by said ring members; annular friction means loosely located between said annular clutch face of said shaft means and said second ring member on the opposite side of the latter from said first ring member, said friction means being slidably connected to said driving structure for rotation therewith; electromagnetic means associated with said ball members for moving the said second member together with said friction means towards said clutch face of said shaft means to engage the latter with said friction means, said electromagnetic means comprising an annular electromagnet located about said friction means and being fixedly connected to said driving structure and a magnetic ring located opposite said electromagnet and being operatively connected to said second ring member to move the latter; and spring means operatively connected to said second ring member for moving the same toward said first ring member when said electromagnetic means is de-energized.

9. A clutch apparatus, comprising in combination, a rotatable driving structure; shaft means rotatably mounted adjacent one end thereof in said driving structure coaxially therewith and having an annular clutch face portion; a first ring member mounted on said shaft means for rotation therewith; a second ring member loosely mounted on said shaft means for free rotation and axial movement thereon, said first and second ring members each having a face portion, said face portions confronting each other and each being formed with a plurality of conical recesses to form pairs of oppositely located recesses; a plurality of ball members respectively mounted in the space between said pairs of recesses and being supported by said ring members; annular friction means loosely located between said annular clutch face of said shaft means and said second ring member on the opposite side of the latter from said first ring member, said friction means being slidably connected to said driving structure for rotation therewith; electromagnetic means associated with said ball members for moving the said second member together with said friction means towards said clutch face of said shaft means to engage the latter with said friction means, said electromagnetic means comprising an annular electromagnet located about said friction means and being fixedly connected to said driving structure and a magnetic ring located opposite said electromagnet and being located at the outer periphery of a cage disc formed with openings in which said ball members are respectively located; and spring means operatively connected to said second ring member for moving the same toward said first ring member when said electromagnetic means is de-energized.

10. A clutch apparatus, comprising in combination, a rotatable driving structure; shaft means rotatably mounted adjacent one end thereof in said driving structure coaxially therewith and having an annular clutch face portion; a first ring member mounted on said shaft means for rotation therewith; a second ring member loosely mounted on said shaft means for free rotation and axial movement thereon, said first and second ring members each having a face portion, said face portions confronting the other member and each being formed with a plurality of conical recesses to form pairs of oppositely located recesses; a plurality of ball members respectively mounted in the space between said pairs of recesses and being supported by said ring members; annular friction means loosely located between said annular clutch face of said shaft means and said second ring member on the opposite side of the latter from said first ring member, said friction means being slidably connected to said driving structure for rotation therewith; electromagnetic means associated with ball members for moving the said second member together with said friction means towards said clutch face of said shaft means to engage the latter with said friction means, said electromagnetic means comprising an annular electromagnet located about said friction means and being fixedly connected to said driving structure and a magnetic ring located opposite said electromagnet and being rotatably mounted on said face portion of said second ring member for free rotation with respect thereto; and spring means operatively connected to said second ring member for moving the same toward said first ring member when said electromagnetic means is de-energized.

11. A clutch apparatus, comprising in combination, a rotatable driving structure; shaft means rotatably mounted adjacent one end thereof in said driving structure coaxially therewith and having an annular clutch face portion; a first ring member fixedly mounted on said shaft means; a second ring member loosely mounted on said shaft means for free rotation and axial movement thereon, said first and second ring members each having a face portion, said face portions confronting each other and each being formed with a plurality of conical recesses to form pairs of oppositely located recesses; a plurality of ball members respectively mounted in the space between said pairs of recesses and being supported by said ring members; annular friction means loosely located between said annular clutch face of said shaft means and said second ring member on the opposite side of the latter from said first ring member, said friction means being slidably connected to said driving structure for rotation therewith; electromagnetic means associated with said ball members for moving the said second member together with said friction means towards said clutch face of said shaft means to engage the latter with said friction means, said electromagnetic means comprising an annular electromagnet located about said friction means and being fixedly connected to said driving structure and a magnetic ring located opposite said electromagnet and being operatively connected to said ball members to move these latter and thereby to move the second ring member; and spring means operatively connected to said second ring member for moving the same toward said first ring member when said electromagnetic means is de-energized.

12. A clutch apparatus, comprising in combination, a rotatable driving structure; shaft means rotatably mounted adjacent one end thereof in said driving structure coaxially therewith and having an annular clutch face portion; a first ring member mounted on said shaft means only for rotation therewith; a second ring member loosely mounted on said shaft means for free rotation and axial movement thereon, said first and second ring members each having a face portion, said face portions confronting each other and each being formed with a plurality of conical recesses to form pairs of oppositely located recesses; a plurality of ball members respectively mounted in the space between said pairs of recesses and being supported by said ring members; annular friction means loosely located between said annular clutch face of said shaft means and said second ring member on the opposite side of the latter from said first ring member, said friction means being slidably connected to said driving structure for rotation therewith; electromagnetic means associated with said ball members for moving the said second member together with said friction means towards said clutch face of said shaft means to engage the latter with said friction means, said electromagnetic means comprising an annular electromagnet located about said friction means and being fixedly connected to said driving structure and a magnetic ring located opposite said electromagnet and being operatively connected to said second ring member to move the latter; and spring means operatively connected to said second ring member for moving the same toward said first ring member when said electromagnetic means is de-energized.

13. Clutch apparatus, comprising in combination, rotatable driving means; shaft means mounted for free rotation adjacent one end thereof on said drive means and being coaxial therewith; a disc fixedly mounted on said shaft means having opposite side faces and being formed in each of said faces with a plurality of conical recesses distributed therearound; a pair of ring members freely mounted on said shaft means on opposite sides of said disc, respectively, each having a side surface portion facing said disc, and each being formed in said surface portion with conical recesses respectively in alignment with said conical recesses of said disc to form pairs of aligned conical recesses on each side of said disc; a plurality of ball members respectively mounted in the space between each of said pairs of recesses and being supported by said disc and ring members; a pair of friction means located about said shaft means on the opposite sides of said ring members from said disc, respectively, one of said friction means being connected to said drive means for rotation therewith and being axially movable on said shaft means; an annular clutch face portion fixedly connected to said shaft means for rotation therewith and located on the opposite side of said friction means from said ring members; a first electromagnet located about said one friction means and being connected to said drive means for rotation therewith; a second stationary electromagnet located about said second friction means; a pair of annular magnetic portions respectively located opposite said first and second electromagnets and being operatively connected to said ball members to move these latter which move the ring members away from said disc when said electromagnets are energized; a stationary clutch face located adjacent said second electromagnet on the opposite side of the other of said friction means from said ring members; and spring means operatively connected to said ring members for urging same toward said disc.

ALBERT DOEBELI.

References Cited in the file of this patent

UNITED STATES PATENTS

| Number | Name | Date |
|---|---|---|
| 1,664,190 | Coldwell | Mar. 27, 1928 |
| 2,061,787 | Warner | Nov. 24, 1936 |
| 2,091,270 | Colman | Aug. 31, 1937 |
| 2,279,986 | Griswold | Apr. 14, 1942 |

FOREIGN PATENTS

| Number | Country | Date |
|---|---|---|
| 599,462 | Great Britain | Mar. 12, 1948 |
| 599,540 | Great Britain | Mar. 15, 1948 |